(12) United States Patent
Kühl et al.

(10) Patent No.: US 6,695,999 B2
(45) Date of Patent: Feb. 24, 2004

(54) METHOD OF MAKING AN ELECTRICALLY CONDUCTIVE FLOOR COVERING

(75) Inventors: Hans-Michael Kühl, Hirschberg (DE); Gerhard Graab, Mannheim (DE); Peter Platzer, Birkenau (DE); Ralf Möller, Rimbach (DE)

(73) Assignee: Firma Carl Freudenberg (DE)

( * ) Notice: Subject to any disclaimer, the term of this patent is extended or adjusted under 35 U.S.C. 154(b) by 0 days.

(21) Appl. No.: 10/052,675

(22) Filed: Jan. 17, 2002

(65) Prior Publication Data

US 2002/0102385 A1 Aug. 1, 2002

(30) Foreign Application Priority Data

Jan. 31, 2001 (DE) .......................... 101 04 488

(51) Int. Cl.⁷ .................. B29B 11/12; B29B 11/14; B29B 13/10; B29C 35/02
(52) U.S. Cl. ................. 264/105; 264/73; 264/77; 264/104; 264/110; 264/115; 264/118; 264/120; 264/122; 264/123; 264/125; 264/160
(58) Field of Search ................. 264/109–129, 264/211.12, 104, 160, 73, 77

(56) References Cited

U.S. PATENT DOCUMENTS

| 4,670,075 A | * | 6/1987 | Heckel et al. .............. 156/222 |
| 6,224,804 B1 | * | 5/2001 | Schwonke et al. ...... 264/173.12 |

FOREIGN PATENT DOCUMENTS

| EP | 0 869 217 | 10/1998 |

\* cited by examiner

*Primary Examiner*—Stephen J. Lechert, Jr.
(74) *Attorney, Agent, or Firm*—Kenyon & Kenyon

(57) ABSTRACT

A method to produce an electrically conductive floor covering made of first particles of a polymer material which are surrounded with electrically conductive second particles and compressed in the intermediate space between the top and bottom sides of the floor covering, with the floor covering having at least one cut surface and the electrically conductive second particles forming conductive paths which connect the upper side and the lower side of the floor covering in an electrically conductive way, in which the first particles comprise at least one granulated elastomer material and form a matrix, in which the second particles form electric conductive paths along the particle boundaries of the first particles.

18 Claims, No Drawings

METHOD OF MAKING AN ELECTRICALLY CONDUCTIVE FLOOR COVERING

BACKGROUND OF THE INVENTION

1. Field of the Invention

The invention relates to an electrically conductive floor covering.

2. Description of Related Art

Static charges which are produced by walking or traveling on plastic floor coverings, particularly at low atmospheric humidity, represent a serious problem, particularly for sensitive electronic components. The electronic components may be damaged or their function may be impaired by electrostatic discharges. Furthermore, in areas in which easily flammable materials are worked with, there is the danger that these materials will be ignited by spark-over in the event of static discharges. The avoidance of static charges is particularly important in surroundings which are air-conditioned and therefore have a low atmospheric humidity, such as computer centers, manufacturing facilities for electronic components and electronic devices, radiological facilities, operating rooms, and other areas in which care is taken to provide an atmosphere low in dust and particles.

The floor coverings typically used, for example those based on polyvinyl chloride or rubber mixtures, are insulators. They may be made conductive if conductive fillers or antistatic agents are mixed in. However, a relatively large quantity, typically between 30 and 50 volume-percent of a conductive filler, must be used to achieve a sufficient conductivity. Metallic materials, conductive carbon black, or graphite are used in particular as conductive fillers, but the use of the necessary quantities results in black or gray products. If antistatic agents are used, there is the disadvantage that these materials react very strongly to changes in atmospheric humidity and their effectiveness is therefore strongly dependent on the environmental conditions.

A method for producing highly compressed, conductive covering material from thermoplastic plastics is known from European Patent A 869 217, in which particles of the thermoplastic plastic, which are provided with a coating containing a conductive substance, are compressed under elevated temperature and high pressure into a block with conductive paths and subsequently split transversely to the direction of the conductive paths into slabs of the desired thickness, with these slabs having conductive paths in the direction of their thickness. In this way, light-colored, conductive floor coverings made of thermoplastic plastic are obtained.

SUMMARY OF THE INVENTION

It is an object of the invention to provide an electrically conductive floor covering which contains a maximum of 3 weight-percent of conductive substances.

These and other objects of the invention are achieved by an electrically conductive floor covering in which the first particles comprise at least one granulated elastomer material and form a matrix in which the second particles form electrically conductive paths along the particle boundaries of the first particles.

DETAILED DESCRIPTION OF THE INVENTION

The floor covering according to the invention allows the production of floor coverings with an irregular pattern, which has the conductive paths cut during production. The electrically conductive elastomer floor covering according to the present invention has an electric volume resistance measured according to IEC 61340 in the range from $10^5$ to $10^7$ $\Omega$. Furthermore, the electrically conductive elastomer floor covering according to the present invention features a surface quality which corresponds to electrically non-conductive elastomer floor coverings.

The electrically conductive elastomer floor covering is preferably one in which the granulated particles pass through sieves with a mesh size between 2 to 8 mm. The conductivity of the final product can be set via the size of the granulated particles and thus by the number of conductive paths per unit area.

The electrically conductive elastomer floor covering contains substances such as carbon black, graphite, metal powder, or conductively doped mineral materials with a grain size <15 $\mu$m as the electrically conductive second particles.

An electrically conductive elastomer floor covering which contains conductive doped mineral fillers such as mica coated with antimony-doped tin oxide is particularly preferred. This embodiment allows the formation of colored conductive paths depending on the pigmentation, in contrast to the black conductive paths if carbon black or graphite is used.

An electrically conductive elastomer floor covering which contains 0.05 to 0.8 weight-percent of the electrically conductive second particles is particularly preferred. In spite of this very low content of conductive substances, electrically conductive elastomer floor coverings are thus obtained which have an electrical volume resistance in the range desired by the user.

Therefore, electrically conductive elastomer floor coverings are possible, having black conductive paths if carbon black or graphite is used or having colored conductive paths if coated mica is used, as are dark colored elastomer floor coverings, in which the conductive paths are set off by color for optical reasons through the use of the coated mica and appropriate pigments.

The electrically conductive elastomer floor covering according to the present invention is produced in that a) one or more unvulcanized elastomer mixtures are granulated, b) granulated particles which pass through sieves having a mesh width of 2 to 8 mm are coated with conductive substances, c) put in a mold and compressed and cross-linked in a first compression procedure at a specific pressure of 5 to 200 bar and a temperature of 60° to 120° C., d) split into strips or slabs, and e) vulcanized in a second compression procedure.

The method according to the present invention allows the production of electrically conductive elastomer floor coverings whose surface properties are comparable with those of electrically non-conductive elastomer floor coverings.

The production of the electrically conductive elastomer floor covering preferably occurs in such a way that the conductive substances are tumbled onto the granulated particles. This method allows effective covering of the granulated particles with conductive substances, through which the conductivity of the final product required by the user is achieved with a low use of conductive substances.

The conductive substances are preferably applied in the form of a bonding agent dispersion. In this way, problems with dust can be avoided and, the mechanical strength properties of the final product can be improved. In particular, an aqueous latex bonding agent is preferably used for this purpose. The use of a latex bonding agent reduces the outlay for safety arrangements and the corresponding environmental impacts because organic solvents are not used.

Multicolored, patterned, or wedge-shaped striped granulated particles are advantageously used in statistically uniform distribution. In particular light-colored granulated particles are preferably used in this case.

The vulcanization in the second compression procedure advantageously occurs at a temperature of 150° to 190° C. and a specific pressure of 100 to 250 bar for a period of 2 to 10 minutes. The vulcanization performed under these conditions results in a final product whose surface properties are comparable with those of typical non-conductive elastomer floor coverings.

The present invention will be described in more detail in the following with reference to two examples and a comparative example.

EXAMPLE 1

A screw-type short extruder is charged with a raw rubber mixture. The extruder is provided with a perforated disk through which the raw rubber mass is pressed and granulated by chopping off the strands. The granulate obtained is coated with an electrically conductive substance by tumbling and subsequently placed in a mold corresponding to the size of the final product, but two or more times thicker, with the quantity of granulate being tailored to the volume of the form with a small excess of approximately 5%, and compressed at a temperature of 80° C. and a pressure of approximately 100 bar for 0.5 min./mm of final thickness. Subsequently, the material is removed from the mold, split to the desired final thickness by means of a splitting procedure, and compressed and vulcanized into the final product in a second compression procedure at a temperature of approximately 180° C. and a pressure of approximately 200 bar for 4 minutes at a final thickness of 2 mm in an appropriately thick mold having a smooth or lightly structured surface. The surface of the electrically conductive elastomer floor covering obtained in this way has few pores and is free of splitting marks.

COMPARATIVE EXAMPLE

A raw rubber mixture granulated and coated in accordance with Example 1 is compressed at a temperature of 180° C. and a pressure of approximately 200 bar and completely vulcanized. The splitting of the slab to the final thickness dimension results in products with a surface having splitting marks and other surface faults, such as pores. These surface faults allow increased soiling during use as a floor covering.

EXAMPLE 2

A carbon black-latex mixture is added to granulates made of a raw rubber mixture, which is produced by pulverizing a rough sheet in a granulating machine at room temperature and limiting the grain size via a sieve insert of, for example, 15 mm hole width. In this case, 50 g of the carbon black-latex mixture is used for each 1000 g of granulate. The latex mixture contains 32.9 g of nitryl butadiene rubber (NBR) latexes with a solids content of 47.5 weight-percent, 15.6 g of a 25 weight-percent dispersion of an electrically conductive carbon black in water, and 1.5 grams of a mixture containing cross-linking chemicals such as sulfur, zinc oxide, stearic acid, and cyclohexyl benzothiazyl sulfeneamide. The granulate and the carbon-black latex dispersion are carefully mixed with one another. The mixing occurs, for example, through tumbling in a sufficiently large vessel. After mixing, the coated granulate is dried at room temperature or temperatures up to 35° C. and then processed according to example 1 into the electrically conductive elastomer floor covering according to the present invention.

What is claimed is:

1. A method for producing a floor covering having first particles of a polymer material which are surrounded with electrically conductive second particles and compressed in an intermediate space between top and bottom sides of the floor covering, the floor covering having at least one cut surface and the electrically conductive second particles forming conductive oaths which connect the top side and the bottom side of the floor covering in an electrically conductive way, wherein the first particles are made of at least one granulated elastomer material and form a matrix in which the second particles form electrically conductive paths along particle boundaries of the first particles, comprising:

a) granulating at least one unvulcanized elastomer mixture,
b) passing granulated particles through sieves having a mesh width of 2 to 8 mm and coating the granulated particles with electrically conductive second particles,
c) molding, compressing and cross-linking the particles in a first compression procedure at a specific pressure of 5 to 200 bar and a temperature of 60° to 120° C.,
d) splitting the molded material into strips or slabs, and
e) vulcanizing the molded material in a second compression procedure.

2. The method according to claim 1, wherein the electrically conductive second particles are tumbled onto the granulated elastomers.

3. The method according to claim 2, wherein multicolored, patterned, or wedge-shaped striped granulated particles are used in statistically uniform distribution.

4. The method according to claim 2, wherein the vulcanization in the second compression procedure occurs at temperatures of 150° to 190° C. at a specific pressure of 100 to 250 bar in a period of 2 to 10 minutes.

5. The method according to claim 2, wherein conductive substances selected from the group consisting of carbon black, graphite, metal powder, and conductively doped mineral materials having a grain size <15 $\mu$m are used.

6. The method according to claim 5, wherein said conductively doped mineral fillers such as mica coated with antimony-doped tin oxide are used.

7. The method according to claim 1, wherein the electrically conductive second particles are applied in the form of a bonding agent dispersion.

8. The method according to claim 7, wherein an aqueous latex bonding agent is used.

9. The method according to claim 7, wherein multicolored, patterned, or wedge-shaped striped granulated particles are used in statistically uniform distribution.

10. The method according to claim 7, wherein the vulcanization in the second compression procedure occurs at temperatures of 150° to 190° C. at a specific pressure of 100 to 250 bar in a period of 2 to 10 minutes.

11. The method according to claim 7, wherein conductive substances selected from the group consisting of carbon black, graphite, metal powder, and conductively doped mineral materials having a grain size <15 $\mu$m are used.

12. The method according to claim 1, wherein multicolored, patterned, or wedge-shaped striped granulated particles are used in statistically uniform distribution.

13. The method according to claim 12, wherein the vulcanization in the second compression procedure occurs at temperatures of 150° to 190° C. at a specific pressure of 100 to 250 bar in a period of 2 to 10 minutes.

14. The method according to claim 12, wherein conductive substances selected from the group consisting of carbon black, graphite, metal powder, and conductively doped mineral materials having a grain size <15 μm are used.

15. The method according to claim 1, wherein the vulcanization in the second compression procedure occurs at temperatures of 150° to 190° C. at a specific pressure of 100 to 250 bar in a period of 2 to 10 minutes.

16. The method according to claim 15, wherein conductive substances selected from the group consisting of carbon black, graphite, metal powder, and conductively doped mineral materials having a grain size <15 μm are used.

17. The method according to claim 1, wherein conductive substances selected from the group consisting of carbon black, graphite, metal powder, and conductively doped mineral materials having a grain size <15 μm are used.

18. The method according to claim 17, wherein said conductively doped mineral fillers such as mica coated with antimony-doped tin oxide are used.

* * * * *

UNITED STATES PATENT AND TRADEMARK OFFICE
CERTIFICATE OF CORRECTION

PATENT NO.    : 6,695,999 B2
DATED         : February 24, 2004
INVENTOR(S)   : Kühl et al.

It is certified that error appears in the above-identified patent and that said Letters Patent is hereby corrected as shown below:

Column 4,
Line 47, change "fillers" to -- materials --;

Column 6,
Line 9, change "fillers" to -- materials --.

Signed and Sealed this

Twenty-eighth Day of June, 2005

JON W. DUDAS
*Director of the United States Patent and Trademark Office*